United States Patent [19]

Tamii

[11] 4,358,688
[45] Nov. 9, 1982

[54] CONTROLLABLE VOLTAGE CONVERTER SYSTEM HAVING A HIGH SWITCHING SPEED

[75] Inventor: Seizo Tamii, Amagasaki, Japan

[73] Assignee: Mitsubishi Denki Kabushiki Kaisha, Tokyo, Japan

[21] Appl. No.: 195,113

[22] Filed: Oct. 8, 1980

[30] Foreign Application Priority Data

Oct. 8, 1979 [JP] Japan .................... 54-130660

[51] Int. Cl.³ .................. H01J 29/80; H04N 9/27
[52] U.S. Cl. .................... 307/77; 315/375; 358/73
[58] Field of Search .......... 320/1; 358/73; 315/375; 307/19, 80, 138, 77, 46, 52, 54, , 61, 63; 363/27; 361/245

[56] References Cited

U.S. PATENT DOCUMENTS 4,284,928  8/1981  Ragot .................... 358/73

FOREIGN PATENT DOCUMENTS 51-75940  6/1976  Japan .

OTHER PUBLICATIONS

"Driving Beam Penetration Color CRTS", S.I.D. Journal vol. 10, No. 3, (1973), pp. 6, 7, 9-11, 28.

Primary Examiner—William H. Beha, Jr.
Attorney, Agent, or Firm—Wenderoth, Lind & Ponack

[57] ABSTRACT

Two identical variable voltage source include respective capacitors serially interconnected across a series combination of a capacitive load and a fixed voltage source. Each variable source further includes a commutation reactor having two windings electromagnetically coupled and connected to each other, and two thyristors connected across the capacitor through one of the reactor windings to invert a voltage across the capacitor from its positive to its negative polarity and vice versa respectively. Either one of two low impedance DC sources charges the capacitor through a mating thyristor and the other reactor winding.

3 Claims, 27 Drawing Figures

(PRIOR ART)

FIG.2

(PRIOR ART)

FIG.4A

(PRIOR ART)

CONTROLLABLE VOLTAGE CONVERTER SYSTEM HAVING A HIGH SWITCHING SPEED

BACKGROUND OF THE INVENTION

This invention relates to a voltage converter system for changing a voltage applied across a capacitive load such as a beam penetration type multi-color cathode ray tube at a high speed with a high efficiency.

Beam penetration type multi-color cathode ray tubes are color cathode ray tubes of the type emitting light in a color which is variable between red and green and is controlled by varying the energy of an electron beam involved through a change in voltage applied between the anode and cathode electrodes thereof. This type of color cathode ray tube is presently in the limelight because it is able to effect a colored graphic display. However, in order to display a multiplicity of data, as in the color display used with radars, it is necessary to switch the high voltage across the capacitive load within a time interval which is not longer than about 15 microseconds. Furthermore with such cathode ray tubes being shielded electromagnetically, the anode side thereof has such an increased capacitance to ground that it is more difficult to change the voltage thereon at a high speed.

For these reasons, it has been considered that in general beam penetration type multi-color cathode ray tubes, the time interval for changing the voltage or color has a limit ranging from several tens to several hundreds microseconds.

There have been already proposed various types of voltage converter systems for changing the voltage across a capacitive load. One of the proposed voltage converter systems comprises a fixed voltage source such as a bias power source, connected to one end of the capacitive load and a pair of identical variable voltage sources connected to the other end of the capacitive load and the fixed voltage source respectively. Each of the variable voltage sources has a capacitor for sharing and holding a constant voltage, a pair of series combinations of a polarity inverting switch and a semiconductor diode connected across the capacitor through a reactor to invert the constant voltage from the positive to negative polarity and vice versa respectively, and a low impedance DC source connected to each series combination of the inverting switch and diode through a compensating switch to compensate for a loss in electrical energy due to the inversion of the voltage's polarity. Each of the DC sources is connected to the junction of the capacitor and the reactor through a semiconductor diode to form a bypass path for a current through the capacitive load.

When a load composed of the capacitive load and the capacitor is capacitive, the voltage across each of the variable voltage sources is skillfully inverted in polarity through the utilization of the current exchange between the reactor and the composite load. Therefore, the current flowing through an associated one of the inverting switches becomes equal to zero when the capacitive load and the capacitor have been completely charged while at the same time the voltage across the capacitor has been inverted in polarity. Under these circumstances, a thyristor switch may be substituted for each of the inverting switches 40, 44, 40' and 44' (see FIG. 5) to open an associated circuit when the abovementioned current becomes equal to zero through the self commutation.

However, with composite loads having large resistive portions, it is difficult to effect the inversion of the applied voltage and the commutation smoothly. Therefore, the use of only thyristor switches leaves problems with respect to the standpoint of stable operation. For this reason, transistorized switches have inevitably been employed to handle the load of the type referred to with high inverted voltages, and it has been necessary to connect the transistors of such switches in a multi-stage cascade manner. Consequently, problems occur in that the resulting circuit configuration including bias circuits is complicated as a whole. The object of the present invention is to provide a new and improved voltage converter system for changing the polarity of a voltage applied across a capacitive load at a high speed.

It is another object of the present invention to provide a new and improved voltage converter system having a simplified circuit configuration.

It is still another object of the present invention to provide a new and improved voltage converter system which may be effectively used with a beam penetration type multi-color cathode ray tube.

SUMMARY OF THE INVENTION

The present invention provides a voltage converter system, for a capacitive load, said system comprising a fixed voltage source connected serially to the capacitive load, and at least one variable voltage source connected across a series combination of the capacitive load and the fixed voltage source, the variable voltage source including a reactor having a pair of windings electromagnetically coupled to each other, a first circuit means formed of the capacitance, one of the windings of the reactor and a first switch interconnected serially to one another, the first switch being controlled to invert the polarity of a voltage charged on the capacitance, and a second circuit means including a low impedance DC source connected to the capacitance through a second switch and the other winding of the reactor, the second circuit means either charging the capacitance from the low impedance DC source in the steady state or responding to a reaction applied thereto through the other winding of the reactor upon inverting the polarity of the voltage across the capacitance, to bias reversely the second switch so as to thereby stop the charging of the capacitance, wherein the voltage across the capacitive load is stepwise controlled in response to the control effected by the first switch.

BRIEF DESCRIPTION OF THE DRAWINGS

The present invention will become more readily apparent from the following detailed description taken in conjunction with the accompanying drawings in which.

DESCRIPTION OF THE PREFERRED EMVODIMENT

Figure 1:
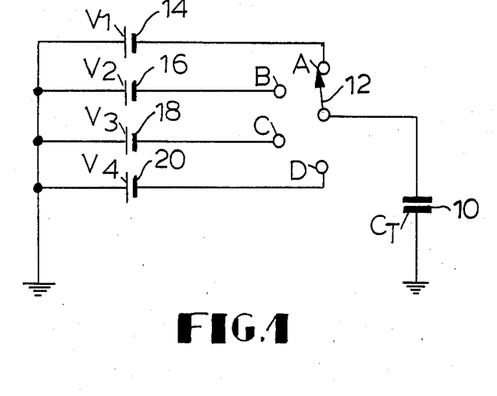
FIG. 1 is a circuit diagram illustrating the fundamental circuit for the switching of voltages across capacitive loads.

FIG. 1 of the drawings illustrates the fundamental circuit for switching from one to another of a plurality of voltages to be applied across a capacitive load. The illustrated arrangement comprises a capacitive load 10 connected at one end to ground, a changeover switch 12 including a movable arm connected to the other end of the capacitive load 10 and a plurality of stationary contacts, in this case four contacts A, B, C and D and, a plurality of voltage sources 14, 16, 18 and 20, each of which is connected at one end thereof to one of the stationary contacts A, B, C and D of the changeover switch 12 and at the other end thereof to ground. The voltage sources 14, 16, 18 and 20 have voltages corresponding to different colors developed on an associated color cathode ray tube (not shown). Those voltage sources are selectively applied across the capacitive load 10 by engaging the movable arm with a selected one of the stationary contacts A, B, C and D. In FIG. 1, the movable arm of the changeover switch 12 is shown as engaging the stationary contact A. Therefore, a voltage across the capacitive load 10 results from the voltage source 14.

The arrangement of FIG. 1 illustrates the fundamental concept and may be practiced in any one of various circuit configurations. Where an attempt is made to switch from one to another of several voltages at a high speed and with a high efficiency, it is desirable to divide a voltage into a fixed voltage component and a variable voltage component and further subdivide the variable voltage component into a plurality of variable voltage portions for the multi-color switching. Therefore, the arrangement illustrated in FIG. 2 is generally put into practice at present.

In the arrangement illustrated, a load generally designated by the reference numeral 10 includes a color cathode ray tube 22 connected at its cathode end to a beam gun driver 24 and having a capacitive load 26 shown as being developed between a point P connected to the anode end of the cathode ray tube 22 and a point C connected to the beam gun driver 24. The point C is connected to a bias power source or a fixed voltage source 28 for providing a fixed voltage component $V_B$ at a voltage $V_T$ applied across the cathode ray tube 22 while the point P is connected to a first variable voltage source 30 which is subsequently connected to ground. The fixed voltage source 28 is connected to ground through a point K and a second variable voltage source 32.

The variable voltage sources 30 and 32 cooperate with each other to provide selectively variable voltage components each forming a variable component of the voltage $V_T$ across the cathode ray tube 22 or the capacitive load 26. To this end, each of the variable voltage sources 30 or 32 inverts or changes the polarity of a voltage $V_P$ or $V_K$ developed thereacross.

Figure 2:
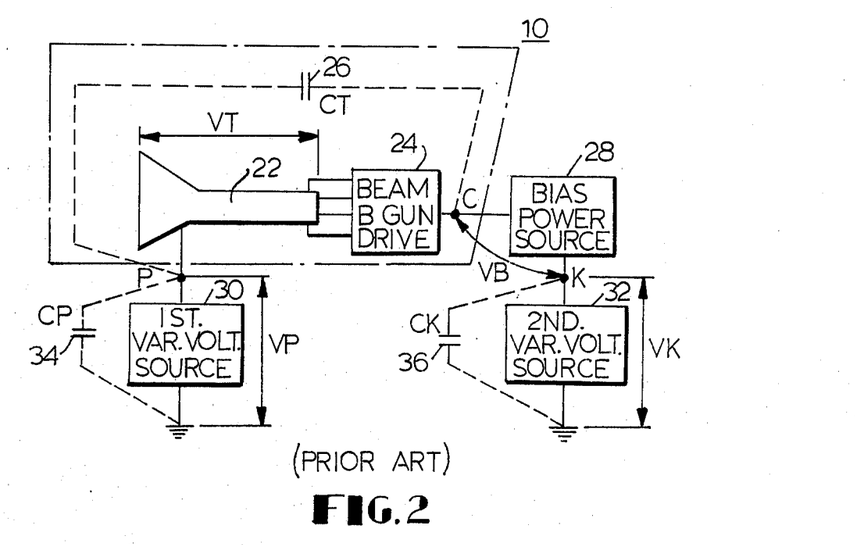
FIG. 2 is a block diagram of a voltage converter circuit generally employed.

Furthermore, a pair of capacitors 34 and 36 are shown in FIG. 2 as being developed between the point P and ground or the first variable voltage source 30 and between the point K and ground or the second variable voltage source 32 respectively. The capacitors 34 and 36 serve to respectively share and hold the voltages $V_P$ and $V_K$ which are constant and may be different from each other.

The operation of the arrangement shown in FIG. 2 may be described in the following Table I:

TABLE I

| Mode of Operation | Voltages Across Capacitive Load 26 In Different Modes of Operation | | |
|---|---|---|---|
| | $V_P$ | $V_K$ | $V_T$ |
| 1 | − | + | $-V_P - V_K - V_B$ |
| 2 | − | − | $-V_P + V_K - V_B$ |
| 3 | + | + | $V_P - V_K - V_B$ |
| 4 | + | − | $V_P + V_K - V_B$ |

By dividing the variable voltage component into the voltages $V_P$ and $V_K$ and switching each of those voltages from one to the other of the polarities as shown in Table I, the voltage $V_T$ across the capacitive load 24 has selectively four different magnitudes in the modes 1, 2, 3 and 4 of operation as listed in Table I. For example, the voltage $V_P$ has a negative polarity and the voltage $V_K$ has a positive polarity in the mode 1 of operation so that the voltage $V_T$ is equal to $(-V_P - V_K - V_B)$.

If an attempt is made to turn the arrangement of FIG. 2 into a practical apparatus, it is found that it is difficult to impart to that apparatus satisfactory performance characteristics for the following reasons: Suitable measures have not been found in conjunction with a circuit configuration of the switch for changing the polarity of the voltage $V_P$ or $V_K$, nor for the delivery of electrical energy to the capacitive load 26 and the absorption of electrical energy discharged from the latter. Furthermore, when the cathode ray tube 22 is shielded electromagnetically, an extremely high capacitance (which is designated by $C_P$ in FIG. 2) actually exists between the anode end of the cathode ray tube 22 and ground and has a magnitude exceeding ten times the capacitance $C_T$ of the capacitive load 26. Under these circumstances it has been difficult to provide for a satisfactory performance.

Figure 5:
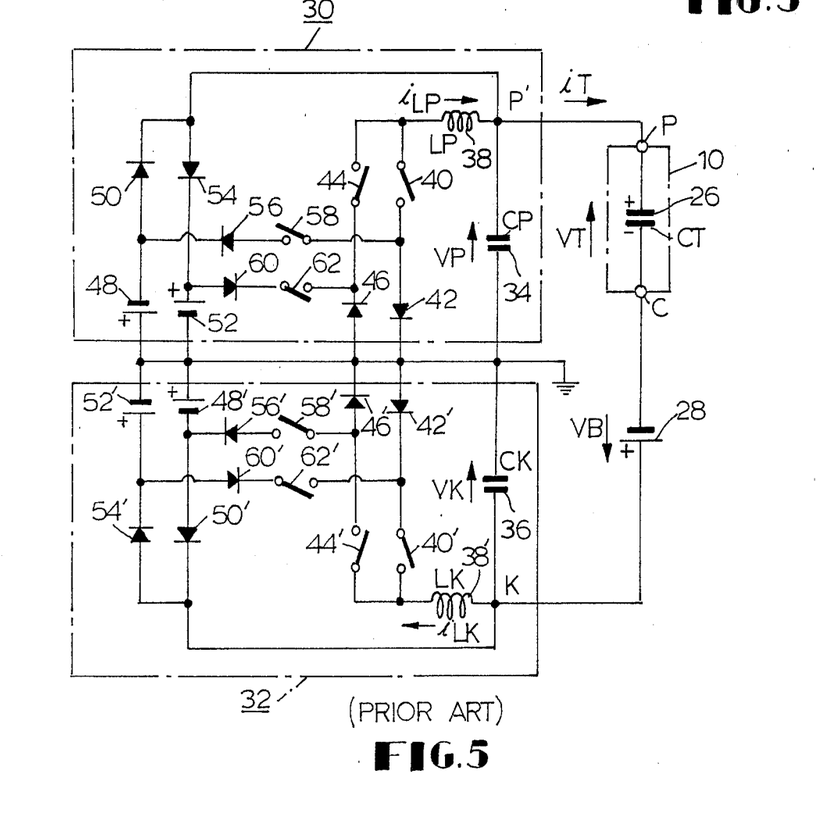
FIG. 5 is a circuit diagram of a conventional voltage converter system.

In order to solve such problems, there has already been proposed the arrangement shown in FIG. 5. For a better understanding of the arrangement shown in FIG. 5, the theoretical operation thereof will now be described in conjunction with FIG. 3 wherein like reference numerals designate the components identical or corresponding to those shown in FIG. 2 and also in FIG. 5. The arrangement illustrated comprises the load 10, represented by the capacitive load 26, connected at one end C to the fixed voltage source 28 for providing the fixed voltage component $V_B$ of the voltage $V_T$ applied across the capacitive load 26 and at the other end P to the capacitor 34 through a junction P′. As described above, the capacitor 34 serves to share and hold the variable voltage component of the voltage $V_T$ applied across the capacitive load 26. The capacitor 36 is then connected to a junction K subsequently connected to the fixed voltage source 28.

Figure 3:
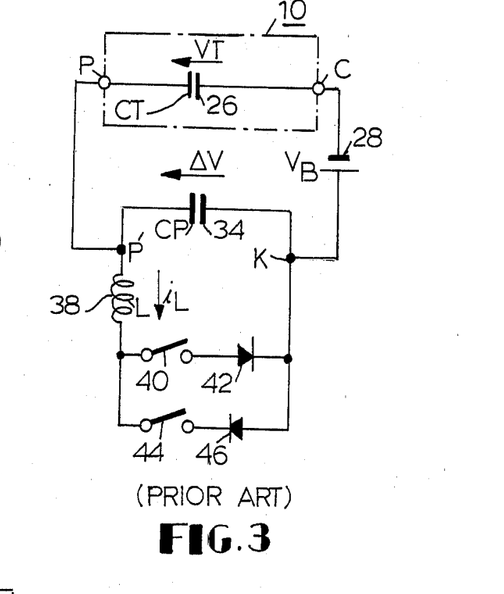
FIG. 3 is a schematic circuit diagram useful in explaining the operation of a conventional voltage converter system shown in FIG. 5.

The junction P′ is connected to a reactor 38 which is operative to temporarily accumulate electrical energy upon varying the polarity of the voltage for forming the variable voltage component. The reactor 38 is connected to a series combination of the polarity changing or inverting switch 40 and a semiconductor diode 42 and also to a series combination of the polarity inverting switch 44 and a semiconductor diode 46. The diode 42 has its cathode electrode connected to the junction K while the diode 46 has its anode electrode connected to the junction K.

Figure 4A:
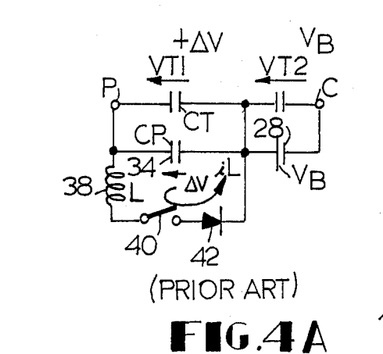
FIG. 4A is a replica of the arrangement shown in FIG. 3 with parts omitted.
Figure 4B:
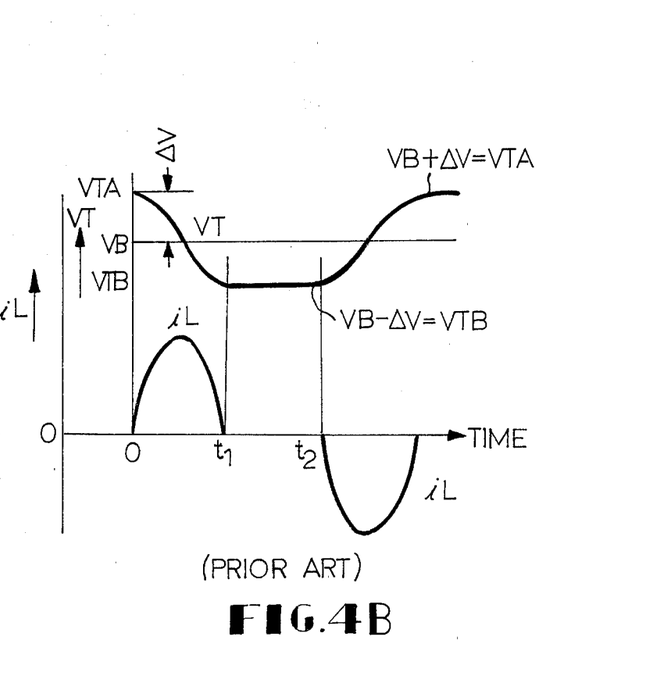
FIG. 4B is a graph illustrating a voltage waveform and current waveforms developed in the arrangement shown in FIG. 4A.

The operation of the arrangement shown in FIG. 3 will now be described on the assumption that the voltage $V_T$ across the capacitive load 26 is changed from its magnitude $V_{TA}$ to its magnitude $V_{TB}$ as shown in FIG. 4B wherein a change in voltage $V_T$ is plotted on the ordinate against time on the abscissa and also with a current flowing through the reactor 38. Assuming also that the arrangement of FIG. 3 forms an ideal circuit which is free from a power loss, the required fixed voltage component $V_B$ may be expressed by $$V_B = (V_{TA} + V_{TB})/2$$

and the variable voltage component includes a voltage difference $\Delta V$ expressed by $$\Delta V = \pm |V_{TA} - V_{TB}|/2.$$

In the arrangement of FIG. 3, the voltage across the ends P and C of the capacitive load 26 is equal to $V_T$ and the capacitive load 26 is charged to the voltage $V_T$ at time point 0 (see FIG. 4B). The voltage $V_T$ is in equilibrium with the sum of the voltage $V_B$ across the fixed voltage source 28 and a voltage $\Delta V$ to which the capacitor 36 has been charged.

Those voltages have the polarity as shown by the arrows in FIG. 3 and the inequality $V_{TA} > V_{TB}$ holds.

In these circumstances it is assumed that there are given the conditions for turning the switch 36 on. Under the assumed conditions, the arrangement of FIG. 3 is modified substantially as shown in FIG. 4A. The arrangement illustrated in FIG. 4A is different from that shown in FIG. 3 only in that in FIG. 4A the series combination of the switch 34 and the diode 42 is omitted. In the illustrated arrangement it may be considered that the voltage $V_T$ accumulated on the capacitive load 26 disposed between the ends P and of the load 10 is divided into a voltage component $V_{T2}$ corresponding to the fixed voltage component $V_B$ and a variable voltage component $V_{T1}$ corresponding to the variable voltage component. Accordingly, the equations $V_{T1} = +\Delta V$ and $V_{T2} = V_B$ hold.

When the switch 36 is turned on at the time point O shown in FIG. 4B, an electric discharge from the parallel combination of the capacitive load 26 and the capacitor 34 charged to the voltage $+\Delta V$ is effected through the reactor 38 and the now closed switch 40 and the diode 42 as will readily be understood from the illustration of FIG. 4A. This results in a flow of a discharge current $i_L$.

FIG. 4B shows this discharge current $i_L$ and the voltage $\Delta V$ plotted on the ordinate against time on the abscissa. As is well known, the discharge current $i_L$ is in the form of a sinusoidal wave having an angular frequency as determined by the capacitance provided by the parallel combination of the capacitive load 26 and the capacitor 34 and an inductance L exhibited by the reactor 38. The voltage $+\Delta V$ across that parallel combination changes following a cosine wave. As shown in FIG. 4B, the discharge current $i_L$ begins to flow at the time point O and becomes equal to zero at a time point $t_1$ while the voltage $+\Delta V$ has a magnitude of $-\Delta V$ at the time point $t_1$.

As a result, the voltage $V_{TA} = V_B + \Delta V$ across the points P and C of the load is changed to the voltage $V_{TB} = V_B - \Delta V$. That is, the voltage $\Delta V$ is inverted in polarity so as to be equal to $-\Delta V$. The diode 42 is reverse biased and put in its OFF state at the time point $t_1$ where the discharge current $i_L$ becomes equal to zero as described above.

Thereafter, the switch 40 is turned off and the switch 44 is turned on at a time point $t_2$. The turn-on of the switch 44 repeats a process identical to that described above excepting that the current $i_L$ and the voltage $\Delta V$ have the polarity reversed from that described in junction with the turn-on of the switch 40. Accordingly, the voltage $\Delta V$ is inverted from the negative to the positive polarity with the result that the voltage across the capacitive load 26 changes from its magnitude of $V_{TB} = V_B - \Delta V$ to that of $V_{TA} = V_B + \Delta V$ as shown in FIG. 4B.

While the arrangement of FIG. 3 has been described in conjunction with the capacitor 34 sharing and holding the variable voltage component and having the capacitance $C_P$ it is to be understood that the capacitor 34 may be replaced by a stray capacitance developed between the anode side of a shielded cathode ray tube and ground as shown in FIG. 2. Since the capacitance exhibited by a parallel combination of the capacitive load 26 and the capacitor 34 is effective for operating the arrangement of FIG. 3, the capacitance $C_P$ of the capacitor 34 may have any desired magnitude. The capacitance $C_P$ is desirably as low as possible in view of the operating performance. However, it is possible to intentionally connect a special value of capacitance $C_P$ across the capacitive load 26 for the purpose of absorbing ripples included in the voltage across the capacitive load 26 and others.

Referring now to FIG. 5 wherein like reference numerals designate the components identical to those shown in FIG. 3, there is illustrated a conventional voltage converter system for selectively providing four voltages to change from one to another of colors displayed on an associated cathode ray tube by adopting the concept as described above in conjunction with FIG. 2. The illustrated arrangement comprises the load 10 including the capacitive load 26 as described above in conjunction with FIG. 2, the first variable voltage source 30 connected between the end P of the capacitive load 26 and ground, and the second variable voltage source 32 connected between the end C of the capacitive load 26 and ground through the fixed voltage source 28. The first variable voltage source 30 is identical in circuit configuration to the second variable voltage source 32 and therefore one of them, for example, the first variable voltage source 30 will be described in detail.

The first voltage source 30 includes a network formed of the components 34, 38, 40, 42, 44 and 46 interconnected as described above in conjunction with FIG. 3 between the end P of the capacitive load 26 and ground. The source 30 further includes a DC source 48 having its positive side connected to ground and its negative side connected to an anode electrode of a semiconductor diode 50 which has its cathode electrode connected to the reactor 38, another DC source 52 having its negative side connected to ground and its positive side connected to a cathode electrode of a semiconductor diode 54 which has its anode electrode connected to the reactor 38. The junction of the DC source 48 and the diode 50 is connected to the junction of the polarity inverting switch 40 and the diode 42 through a series combination of a semiconductor diode 56 and a compensating switch 58 with the diode 56 arranged so as to permit a current to flow therethrough into the DC source 48. Similarly, the junction of the DC source 52 and the diode 54 is connected to the junction of the switch 44 and the diode 46 through a series combination of a semiconductor diode 60 and a compensating switch 62 with the diode 62 arranged so as to cause a current to flow therethrough from the DC source 52.

Each of the DC sources 48 and 52 is of a low internal impedance and operative to compensate for electrical energy which has been lost when the variable voltage source 30 changes or inverts the polarity of a voltage in order to form a variable voltage component. Upon inverting the polarity of the voltage, a current from the capacitive load 26 is arranged to travel through the diode and the DC source 50 and 48 or 54 and 52 respectively as the case may be. Each of the diodes 50 or 54 serves to form a low impedance current path with the DC source 48 or 52 and hold it while each of the diode 56 or 60 serves to form a compensating network traced from the source 48 through the the switch 58 or 62, the switch 40 or 44, the reactor 38, the capacitor 34 and thence to the source 48 or 52 to replenish the capacitor 34 with electrical energy.

The second variable voltage source 32 includes the components identical to those disposed in the first variable voltage source 30 and designated by the reference numerals identifying the identical components of the first source 30 and having the prime except for the capacitor 36 similar to the capacitor 34. For example, the reference numeral 48' designate a DC source identical to the DC source 48.

As in the arrangement of FIG. 2, that shown in FIG. 5 has the voltages $V_P$ and $V_K$ with the positive and negative polarities selectively developed across the first and second variable voltage sources 30 and 32 respectively. Each of the voltages $V_P$ or $V_K$ is caused to change in polarity in the same manner as described above in conjunction with FIG. 3. Therefore, the voltage $V_T$ across the capacitive load 26 changes from one to another of four magnitudes expressed by $$V_T = (\pm V_P) \pm (\pm V_K) + V_B.$$

By selecting voltages across the variable voltage sources 30 and 32 on the assumption that the equation $V_P = 2V_K$ holds, the voltage $V_T$ may selectively have four magnitudes of $(V_B + 3V_K)$, $(V_B + V_K)$, $(V_B - V_K)$ and $(V_B - 3V_K)$ corresponding to the modes of operation shown in Table I. In other words, the voltage $V_T$ can be changed with increments of $2V_K$ or $V_P$.

Figures 6A, 6B:
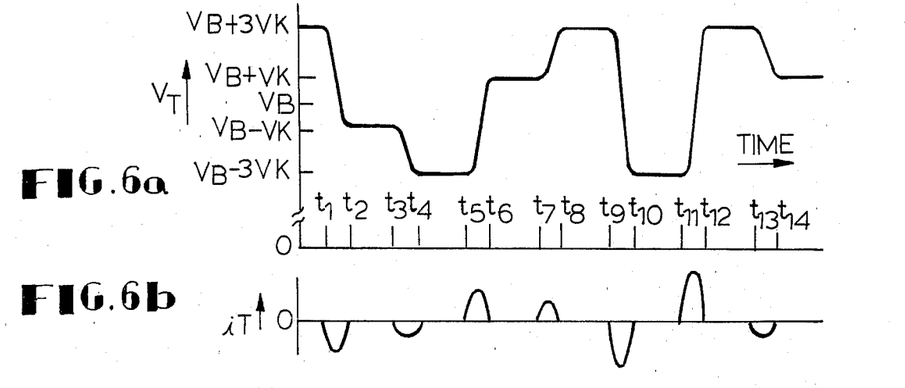
FIGS. 6a–6j are graphs illustrating waveforms developed at various points in the arrangement shown in FIG. 5.

FIGS. 6a–6j illustrate the status of all the switches shown in FIG. 5 which are changed with time and waveforms developed at various points in the arrangement shown in FIG. 5 on the assumption that the voltage $V_T$ across the capacitive load 26 changes in accordance with a waveform as shown in FIG. 6a. It is assumed that currents and voltages developed at various points in the arrangement of FIG. 5 have a positive polarity corresponding to the arrows denoted beside the various points.

Before the operation thereof is described, the arrangement of FIG. 5 will now be described in terms of differences between it and the arrangement shown in FIG. 3. That is, the FIG. 5 arrangement is different from the FIG. 3, arrangement in the following respects:

(I) Although it has been assumed that the arrangement of FIG. 3 is free from any energy loss during its operation, a very small energy loss occurs during the operation of the arrangement shown in FIG. 5. Accordingly, a loss in electrical energy occurs upon inverting the polarity of each voltage and the magnitude of the voltage after the inversion of the polarity decreases by the loss as compared with that before the inversion of the polarity.

(II) In FIG. 3, a single voltage has inverted in polarity whereas in FIG. 5, two voltages are inverted in polarity. This means that when the two voltages have been separately inverted in polarity, a charging or a discharging current through the capacitive load 26 flows through that variable voltage source in which the voltage is not inverted in polarity. Therefore, the charging or discharging current causes a variation in voltage across the variable voltage source not effecting the inversion of the polarity.

The arrangement of FIG. 5 includes countermeasure to the two problems described above.

Regarding the abovementioned difference (I), it is necessary to compensate for the lost electrical energy after the inversion of the voltages polarity. To this end, the DC sources 48, 48', 52 and 52' have been provided as compensating sources and the diodes 56, 56', 60 and 60' have formed the compensating current paths with the switches 58, 58', 62 and 62' as described above.

Regarding the difference (II), it is necessary to connect low impedance bypass paths across the capacitors 34 and 36 respectively so as to prevent the charging or discharging current through the capacitive load 26 from flowing through the capacitors 34 or 36 in one of the variable voltage sources 30 or 32 due to the operation of the other of the sources 32 or 30. These low impedance bypass paths have been partly formed of diodes 50, 54 and 50', 54' serially connected to the DC sources 48, 52 and 48', 52' respectively as described above.

The operation of the arrangement shown in FIG. 5 will now be described in conjunction with FIGS. 6a–6j. As shown by FIG. 6a, the voltages $V_P$ and $V_K$ of a positive polarity have been developed across the first and second variable voltage sources 30 and 32 before a time point $t_1$. The polarity of the voltages $V_P$ and $V_K$ is shown at the arrows in FIG. 5 and directed to add those voltages to the voltage $V_B$ across the fixed voltage source 28. Therefore, the voltage $V_T$ across the capacitive load 26 has a magnitude expressed by $$V_T = V_B + V_P + V_K = V_B + 3V_K.$$

At the time point $t_1$, the closed switches 44 and 62 in the first variable voltage source 30 are turned off or opened while the inverting switch 40 in the same source is turned on or closed. This closure of the switch 40 results in the discharge of an electric charge accumulated on the capacitor 34 through the reactor 38 the now closed switch and the diode 42. Simultaneously, that portion of an electric charge on the capacitive load 26 corresponding to the voltage $V_P$ is charged through the reactor 38, the closed switch 40, the diode 44, the second variable source 32 and the fixed voltage source 28.

This results in the repeating of the process as described in conjunction with the closure of the switch 40 shown in FIG. 3. Therefore, the voltage $V_P$ is inverted in polarity to be substantially equal to $-V_P$ for the reason as described above with respect to the difference I) between FIGS. 3 and 5. Currents $i_{LK}$ and $i_T$ flow through the reactor 38 and the associated components between the time point $t_1$ and a time point $t_2$ as shown by FIGS. 6d and 6b respectively.

Figure 6C:
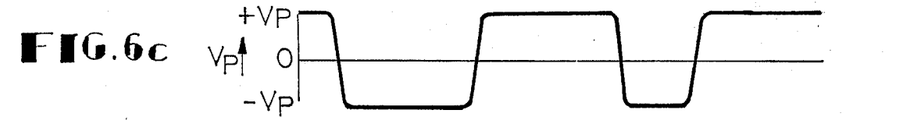
Figures 6D, 6E, 6F, 6G, 6H:
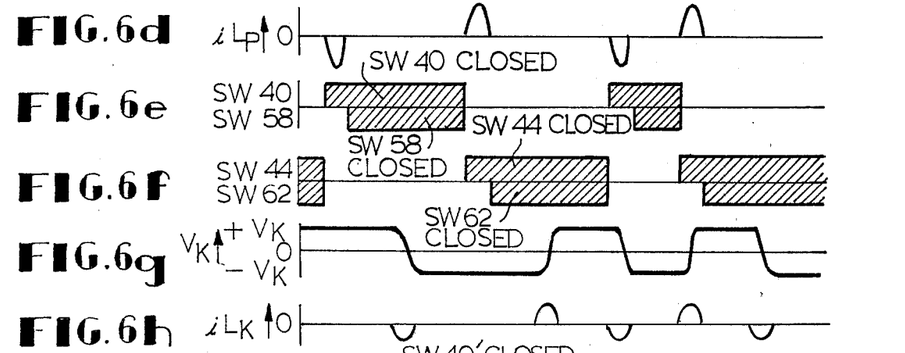
Figures 6I, 6J:
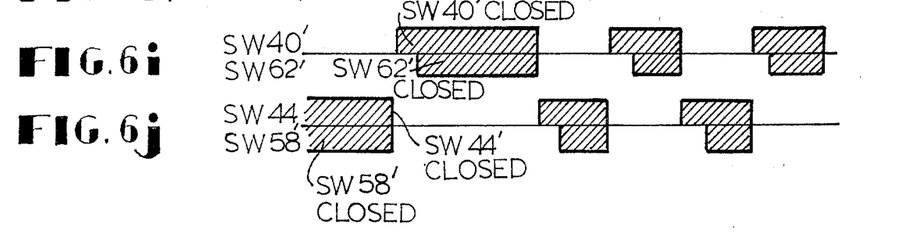

The compensating switch 58 is then closed at the time point $t_2$, where the currents $i_{LP}$ and $i_T$ becomes equal to zero. This closure of the switch 58 causes the DC source 48 to compensate for the lost energy as described above. As a result, the capacitor 34 and the capacitive load 26 are charged with a voltage reversed in polarity from and exactly equal in magnitude to that obtained before the inversion of its polarity. The voltage $V_P$ across the capacitor 34 has a magnitude of $-V_P$ as shown by FIG. 6c. The voltage $V_T$ across the capacitive load 26 has a magnitude expressed by $$V_T = V_B + 3K_K - 2V_P = V_B - V_K$$

and the magnitude of $+V_K$ is shown in FIG. 6g.

Subsequently, the inverting switch 40' in the second variable source 32 is closed at the time point $t_3$, resulting in the process effected with the associated components in the second source 32 as described above in conjunction with the closure of the switch 40 shown in FIG. 3. The voltage $V_K$ across the capacitor 36 is inverted in polarity at a time point $t_4$ where the compensating switch 62' is closed. As a result, the voltage $V_K$ has a magnitude exactly equal to $-V_K$ and the voltage $V_P$ across the capacitor 36 remains unchanged as in the case the switches 40 and 58 are successively closed (see FIGS. 6g and 6c). The voltage $V_T$ across the capacitive load 26 has a magnitude expressed by $$V_T = V_B - V_K - 2V_K = V_B - 3V_K$$

and that value is held between the time point $t_4$ and a time point $t_5$ as shown by FIG. 6a.

At the time point $t_5$, the switches 40 and 58 are opened while the inverting switch 44 is closed. The closure of the switch 44 results in the process as described above in conjunction with the closure of the switch 44 shown in FIG. 3. Compensating switch 62 is then closed at a time point $t_6$. Therefore, the voltage $V_P$ across the capacitor 34 is inverted in polarity and held at a constant magnitude of $+V_P$ (see FIG. 6c) while the voltage $V_K$ across the capacitor 36 remains unchanged (see FIG. 6g) as will readily be understood from the foregoing description for FIG. 5. As a result, the voltage $V_T$ across the capacitive load 26 has a magnitude expressed by $$V_T = V_B - 3V_K + 2V_K = V_B + V_K$$

and this value is held between the time point $t_6$ and a time point $t_7$ as shown by FIG. 6a.

At the time point $t_7$, the switch 44' is closed and the switch 58' is then closed at a time point $t_8$. Therefore, the voltage $V_K$ across the capacitor 36 has the positive polarity similarly inverted from the negative polarity and its magnitude remains unchanged (see FIG. 6g) while the voltage $V_P$ across the capacitor 34 also remains unchanged (see FIG. 6c). Therefore, the voltage $V_T$ across the capacitor 26 has a magnitude expressed by $$V_T = V_B + V_K + 2V_K = V_B + 3V_K$$

and this value is held between the time point $t_8$ and a time point $t_9$ (see FIG. 6a).

FIG. 6a–6j further illustrate that the inverting switches 40 and 40' are closed at the time point $t_9$ and the compensating switches 58 and 62' are closed at a time point $t_{10}$, resulting in the voltage $V_T$ across the capacitive load 26 having a magnitude expressed by $$V_T = V_B + 3V_B - 4V_B - 2V_B = V_B - 3V_K$$

and this value is held between the time point $t_{10}$ and a time point $t_{11}$.

Subsequently, the voltage $V_T$ is changed to a magnitude expressed by $$V_T = V_B - 3V_B + 4V_K + 2V_K = V_B + 3V_K$$

by opening the switches 40, 58, 40' and 62' and closing the switches 44 and 44' at the time point $t_{11}$ followed by the closure of the switches 62 and 58' at a time point $t_{12}$.

From the foregoing it will readily be understood that in the arrangement of FIG. 5, the inverting switches can be selectively closed and then the associated compensating switch or switches closed so as to change the voltage across the capacitive load to one of the four predetermined magnitudes.

While the arrangement of FIG. 5 is shown as including the junction of the two variable voltage sources connected to ground it is to be understood that the same may be connected at any desired point to ground.

When a load composed of the capacitive load and the capacitor 34 or 36 is capacitive, the voltage across each of the variable voltage sources 30 or 32 is skillfully inverted in polarity through the utilization of the current exhange between the reactor and the composite load. Therefore, a current flowing through an associated one of the inverting switches 40, 44, 40' and 44' becomes equal to zero when the capacitive load 26 and the capacitor 34 or 36 have been complete by charged while at the same time the voltage across the capacitor 34 or 36 has been inverted in polarity. Under these circumstances, a thyristor switch may be substituted for each of those switches 40, 44 so as, 40' and 44' to open an associated circuit upon the abovementioned current reaching a zero magnitude through self commutation.

However, with a composite load having a large resistive portion, it is difficult to smoothly effect the inversion of the applied voltage and the commutation. Therefore, the use of thyristor switches leaves the problems with respect to the standpoint of a stable operation. For this reason, transistorized switches have been inevitably employed to handle the load of the type referred to. With the inverted voltages being high, it has been necessary to connect transistors in a multi-stage cascade manner. Consequently, problems have been caused in that the resulting circuit configuration including bias circuits is complicated as a whole.

The present invention contemplates solving those problems by the provision of a voltage converter circuit using thyristor switches for performing the commutation function to simplify its circuit configuration.

Figure 7:
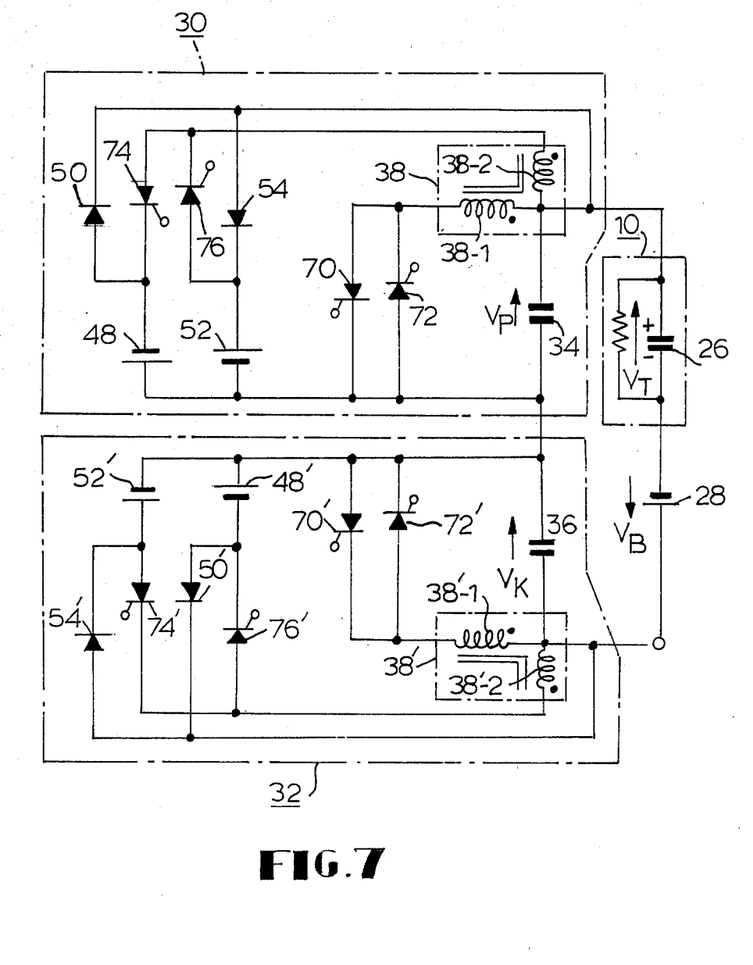
FIG. 7 is a circuit diagram of one embodiment according to the voltage converter system of the present invention.

Referring now to FIG. 7, wherein like reference numerals designate the components identical or corresponding to those shown in FIG. 5, there is illustrated one embodiment according to the voltage converter system of the present invention. The illustrated arrangement comprises the load 10 including the capacitive load 26 connected across a series combination of the capacitors 34 and 36 through the fixed voltage source 28 as in the arrangement of FIG. 5. The capacitor 34 is disposed in the first variable voltage source 30 and the capacitor 36 is disposed in the second variable voltage source 32. The first and second variable voltage sources 30 and 32 are identical to each other and therefore only the first source 30 will now be described in detail.

The first variable voltage source 30 includes the commutating reactor 38 having a pair of first and second windings 38-1 and 38-2 respectively electromagnetically coupled and connected to each other and a pair of inverting thyristor switches 70 and 72 connected in a parallel circuit relationship across the capacitor 34 through the first winding 38-1 of the reactor 38. Thus, a first closed circuit or a commutation circuit is formed of the capacitor 34, the first reactor winding 38-1 and the thyristor switch 70 or 72; the thyristor switches 70 and 72 are reversed into polarity from each other.

The arrangement further comprises the low impedance DC source 48, such as the DC source 48 in FIG. 5, connected at its negative end to the cathode electrode of a compensating thyristor switch 74 and at its positive end to the capacitor 34. The thyristor switch 74 has its anode electrode connected to the capacitor 34 through the second reactor winding 38-2. Similarly, the low impendance DC source 52 is connected at its positive end to the anode electrode of another compensating thyristor switch 76 and at its negative end to the capacitor 34. The thyristor switch 76 has its cathode electrode connected to the capacitor 34 through the second reactor winding 38-2. Therefore, a second closed circuit is formed of the DC source 48 or 52, the compensating thyristor 74 or 76, the second reactor winding 38-2 and the capacitor 34. The second closed circuit serves as an auxiliary charging or compensating circuit for the capacitor 34 as will be apparent later.

The DC source 48 is also connected at its negative end to the capacitive load 26 or the junction of the reactor windings 38-1 and 38-2 through a semiconductor diode 50 such as the diode 50 shown in FIG. 5 and the DC source 52 is also connected at its positive end to the capacitive load 26 or the junction of the reactor windings 38-1 and 38-2 through a semiconductor diode 54 such as the diode 54 shown in FIG. 5. The diode 54 is arranged so that a current from the second reactor winding 38-2 flows therethrough into the DC source 52. The diode 50 is opposite in polarity to the thyristor switch 54.

The components disposed in the second variable voltage source 32 are designated by the reference numerals identifying the identical components included in the first variable source 30 but having the prime added thereto. For example, the reference numeral 70' designates an inverting thyristor switch identical to the thyristor switch 70. The communicating reactor 38' includes a pair of electromagnetically coupled windings 38'-1 and 38'-2 having respective instantaneous voltages induced thereacross as shown by the dot convention. The dot convention is also used with the reactor 38 to indicate the instantaneous voltages induced across the windings 38-1 and 38-2.

From the foregoing it is seen that the arrangement of FIG. 7 is inherently different from that shown in FIG. 5 only in that in FIG. 7, the reactor has a pair of first and second windings and the thyristor switch is substituted for the series combination of a non-polarized switch and semiconductor diode as shown in FIG. 5.

The operation of the arrangement shown in FIG. 7 will now be described in conjunction with FIGS. 8a–8j wherein there are illustrated waveforms developed at various points in the arrangement of FIG. 7.

Figure 8A:
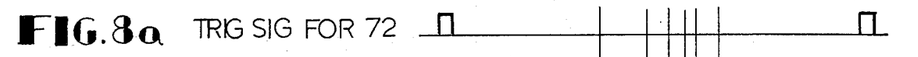
FIGS. 8a–8j are graphs illustrating waveforms developed at various points in the arrangement shown in FIG. 7.
Figures 8B, 8C, 8D:
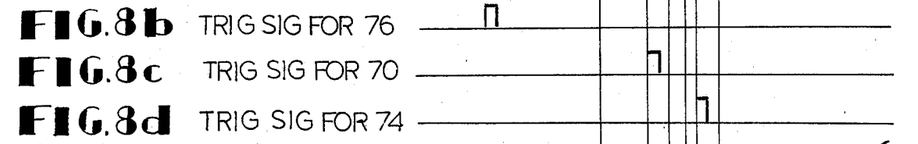
Figures 8E, 8F:
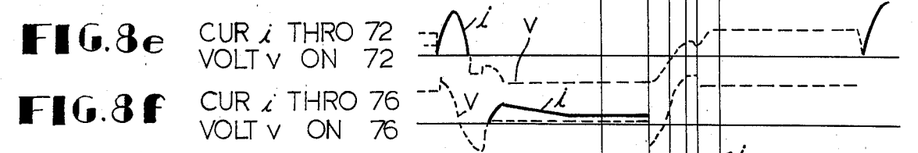
Figures 8G, 8H, 8I:
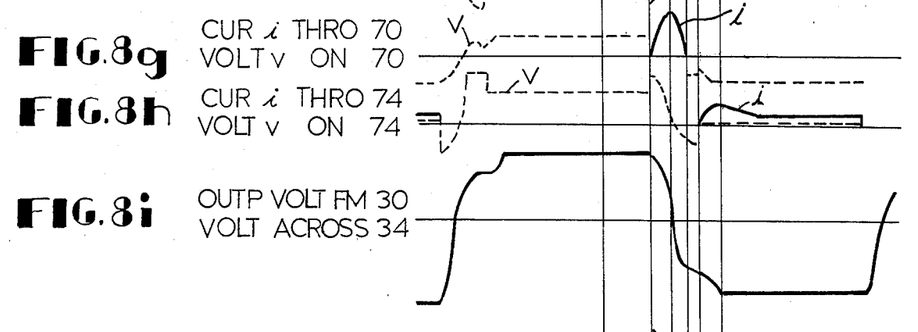

As shown by FIG. 8i, the voltage $V_P$ across the capacitor 34 or an output voltage from the first variable voltage source 30 at a time point $t_o$ has a positive polarity as shown by the arrow denoted beside the same as shown in FIG. 7. In order to maintain the voltage across the capacitor 34 at a magnitude $V_P$, the DC source 52 at the time point $t_o$ supplies the electric power required for a resistive load portion to the load 10 through an auxiliary charging circuit including the thyristor switch 76, and the second winding 38-2 of the commutating reactor 38.

A time point $t_2$ is reached where the output voltage from the first variable voltage source 30 is destined to be inverted in polarity so as to be equal to a magnitude of $-V_P$. This inversion of the voltage will be subsequently described.

At the time point $t_2$ a triggering signal (see FIG. 8c) is applied to the gate electrode of the thyristor switch 70 in the first or commutation circuit to put the switch 70 in its conducting state. This causes the output voltage from the variable voltage source 30 to be applied to the first winding 38-1 of the commutating reactor 38. That output voltage is equal in magnitude to the voltage across the capacitor 34 for sharing and holding or balancing the voltage.

Therefore, a series resonance circuit is formed substantially of a capacitance having a capacitive component of the load 10 combined with the capacitance 34, an inductance exhibited by the first reactor winding 38-1 and the conducting thyristor switch 70. As a result, a current flowing through the second winding 38-2 is transferred to the first winding 38-1 as shown in FIG. 8g with the result that a substantially sinusoidal current is initiated to flow through the commutation circuit with its initial magnitude equal to the magnitude of the current as transferred.

Since the first and second reactor windings 38-1 and 38-2 are interconnected to induce instantaneous voltages thereacross as shown by the dot convention, the voltage across the voltage balancing capacitor 34 is applied to the first reactor winding 38-1. This causes the second winding 38-2 to induce a voltage proportional to the turn ratio between the first and second windings 38-1 and 38-2 due to the electromagnetic coupling therebetween. However, since the voltage across the capacitor 34 at the time point $t_1$ is substantially equal to the voltage across the DC source 52, the voltage induced across the second winding 38-2 is applied across the thyristor switch 76 as a reverse voltage. A time interval of application of the reverse voltage continues to the time point $t_2$ where the rate of change of a current flowing through the thyristor switch 70 is substantially inverted as shown in FIG. 8f. By selecting the circuit parameters so as to render this time interval longer than the turn-on time of the thyristor switch 76, the latter switch can be put and held in its OFF state. It is noted that after the time point $t_2$, the sinusoidal current continues to flow through the thyristor switch 70 until the current through the series resonance circuit as described above is inverted in polarity.

Assuming that this sinusoidal current passes through its zero point at a time point $t_3$, the output voltage from the variable voltage source 30 has been inverted in polarity at that time point $t_3$. The inverted voltage has a magnitude equal to that of the abovementioned voltage $V_P$ minus a magnitude corresponding to the energy loss occurring in the series resonance circuit. However, the inverted voltage can have its magnitude nearly equal to $-V_P$ by designing the circuit so as to render the energy loss in the circuit to be small.

Accordingly, at and after the time point $t_3$ where the sinusoidal current flowing through the thyristor switch 70 becomes equal to zero, that switch is reversely biased with the voltage $-V_P$ and is conducting by itself.

At a time point $t_4$, the thyristor switch 74 is put in its conducting state by having a trigger signal applied to a gate electrode thereof as shown in FIG. 8d. The conduction of the thyristor switch 74 causes the DC source 48 to charge the capacitor 34 through a current path including the now conducting switch 74 and the second reactor winding 38-2 as shown in FIG. 8h to compensate for the decrease in inverted voltage $-V_P$.

Since the second winding 38-2 forms a series resonance circuit with the capacitor 34, the capacitor 34 is overcharged with energy accumulated in the reactor 38 after a time point $t_5$. This results in the voltage across the capacitor 34 exceeding the magnitude $-V_P$. In order to prevent this overcharging of the capacitor 34, the diode 50 is operated to clamp the voltage across the capacitor 34 to that across the DC source 48. At the same time, a direct current to be supplied to the resistive load portion from the variable voltage source 30 is supplied from the DC source 48 through the thyristor switch 74. Alternatively, if a clamping current through the diode 50 is greater than the current for the resistive load portion, that direct current is supplied from the DC source 48 through the diode 50.

The voltage across the variable voltage source 30 is inverted from its negative to its positive polarity by repeating the process as described above expecting that triggering signals are applied to the thyristor switches 72 and 76 respectively as shown in FIGS. 8a and 8b and the DC source 52 charges the capacitor 34. Current flowing through the thyristor switches 72 and 76 are shown by the solid lines in FIG. 8e and 8f.

Figure 8J:
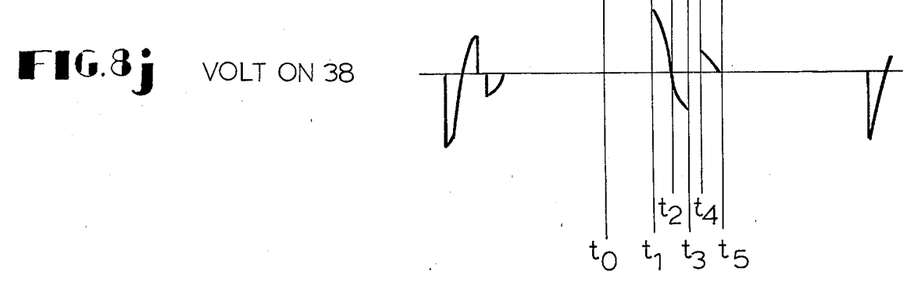

In FIG. 8j, a voltage across the commutating reactor 38 is shown and a voltage across the thyristor switch is shown as an associated waveform by means of a dotted line.

The voltage $V_K$ across the second variable voltage source 32 is inverted in polarity in the same manner as described above.

Assuming that the equation $V_P = 2V_K$ holds as in the arrangement of FIG. 5, the inverting thyristor switches 70 and 72 in the first variable voltage source 30 and those 70' and 72' in the second variable voltage source 32 are selectively put in their conducting state and then an associated one of the compensating thyristor switches 74, 76 and 74' and 76' is put in its conducting state at various time points shown in FIGS. 6a-6j. Under these circumstances, the voltage $V_T$ across the capacitive load 26 is stepwise changed from one to another of the four predetermined magnitudes as in the arrangement of FIG. 5.

A voltage converter system is therefore provided having a simplified circuit configuration because of the use of thyristor switches controlled by a commutating reactor including a pair of windings electromagnetically coupled to each other.

While the present invention has been illustrated and described in conjunction with a single preferred embodiment thereof, it is to be understood that numerous changes and modifications may be resorted to with departing from the spirit and scope of the present invention. For example, the thyristor switch may be formed of a reverse conducting thyristor and a semiconductor diode serially connected thereto. The commutating reactor may include a single winding with a tap. Furthermore, the voltage across the capacitive load may be successively changed from one to another of any desired number of predetermined magnitudes stepwise in any desired pattern.

What is claimed is:

1. A voltage converter system for a capacitive load comprising: a fixed voltage source connected serially to said capacitive load, and at least one variable voltage source connected across a series combination of said capacitive load and fixed voltage source, said variable voltage source including a capacitance operatively coupled to said capacitive load, a reactor having a pair of windings electromagnetically coupled and connected to each other, first circuit means formed of said capacitance, one of said reactor windings and a first switch means interconnected serially to one another, said first switch means being controlled to invert the polarity of a voltage charged on said capacitance, and a second circuit means including a low impedance DC source, second switch means, the other of said reactor windings and said capacitance interconnected serially to one another, said second circuit means either charging said capacitance from said low impedance DC means in the steady state or responding to a reaction applied thereto through the other winding of said reactor upon inverting the polarity of the voltage across said capacitance, to bias reversely said second switch means so as to thereby stop the charging of said capacitance, wherein the voltage across said capacitive load is stepwise controlled in response to the control effected by said first switch means.

2. A voltage converter system as claimed in claim 1, wherein each of said first and second switch means is formed of a thyristor.

3. A voltage converter system as claimed in claim 1 wherein each of said first and second switch means is formed of a reverse conducting thyristor and a semiconductor diode connected serially thereto.

* * * * *